(12) United States Patent
Villegas

(10) Patent No.: US 9,054,561 B2
(45) Date of Patent: Jun. 9, 2015

(54) CONCENTRATOR PHOTOVOLTAIC SYSTEM WITH TRACKING MOTOR BEARING SUPPORT

(75) Inventor: Robert J. Villegas, Long Beach, CA (US)

(73) Assignee: Suncore Photovoltaics Incorporated, Albuquerque, NM (US)

( * ) Notice: Subject to any disclaimer, the term of this patent is extended or adjusted under 35 U.S.C. 154(b) by 416 days.

(21) Appl. No.: 13/569,671

(22) Filed: Aug. 8, 2012

(65) Prior Publication Data

US 2014/0041469 A1    Feb. 13, 2014

(51) Int. Cl.
| | |
|---|---|
| F16H 19/02 | (2006.01) |
| H02K 7/08 | (2006.01) |
| F16H 57/039 | (2012.01) |
| F16H 57/021 | (2012.01) |
| F16H 57/02 | (2012.01) |
| F24J 2/54 | (2006.01) |

(52) U.S. Cl.
CPC ............... H02K 7/081 (2013.01); *Y10T 74/188* (2013.01); *Y10T 74/18568* (2013.01); *F16H 2057/0213* (2013.01); F16H 57/039 (2013.01); *F16H 2057/02073* (2013.01); *F24J 2002/5437* (2013.01); *F24J 2002/5462* (2013.01)

(58) Field of Classification Search
USPC .............. 74/425, 426, 427; 136/243, 244
See application file for complete search history.

(56) References Cited

U.S. PATENT DOCUMENTS

| | | | | |
|---|---|---|---|---|
| 3,715,932 A | * | 2/1973 | Sharp | 74/42 |
| 4,968,355 A | * | 11/1990 | Johnson | 136/246 |
| 5,216,929 A | * | 6/1993 | Ochiai et al. | 74/425 |
| 5,836,076 A | * | 11/1998 | Duta et al. | 29/893.1 |
| 5,839,320 A | * | 11/1998 | Komachi | 74/425 |
| 5,957,000 A | * | 9/1999 | Pecorari | 74/425 |
| 6,044,723 A | * | 4/2000 | Eda et al. | 74/388 PS |
| 6,889,578 B2 | * | 5/2005 | Spaziani et al. | 74/661 |
| 6,912,927 B2 | * | 7/2005 | Eberle | 74/425 |
| 7,051,610 B2 | * | 5/2006 | Stoianovici et al. | 74/425 |
| 7,192,146 B2 | * | 3/2007 | Gross et al. | 359/853 |
| 8,234,948 B2 | * | 8/2012 | Kohigashi et al. | 74/424 |

* cited by examiner

*Primary Examiner* — David M Fenstermacher
(74) *Attorney, Agent, or Firm* — Mueting, Raasch & Gebhardt, P.A.

(57) ABSTRACT

A drive apparatus for a concentrator photovoltaic array including a gearbox case, a motor body housed within the gearbox case and a motor shaft coupled to and extending though a motor bearing of the motor body and having an axis of rotation. A front shaft mount bearing is coupled to one distal end of the motor shaft and a rear shaft mount bearing coupled to the other distal end of the motor shaft, and the front and rear shaft mount bearings are constrained by the gearbox case. A driver gear can be coupled to the motor shaft to drive the photovoltaic array. The front and rear shaft mount bearings transfer loads from the motor bearing to the gearbox case.

19 Claims, 5 Drawing Sheets

CONCENTRATOR PHOTOVOLTAIC SYSTEM WITH TRACKING MOTOR BEARING SUPPORT

TECHNICAL FIELD

The present invention relates generally to motors and in particular, but not exclusively, to a motor bearing support and a system using the motor bearing support.

BACKGROUND

Solar tracking systems are systems in which one or more terrestrial solar cell arrays track the motion of the sun and convert sunlight into electrical energy. Accurate solar tracking is necessary because the amount of power generated by a given solar cell is related to the amount of sunlight that impinges on that solar cell. This is a particular concern for a concentrating solar cell array, which uses lenses to focus sunlight onto respective solar cells, because a tracking misalignment of only a few degrees can significantly reduce the amount of sunlight impinging on the solar cells and hence reduce the power output of the solar cells.

Solar tracking is achieved by properly orienting the solar array relative to the sun using motors and actuators to move the array (e.g., in roll and pitch or in azimuth and elevation directions) along a predetermined path that properly tracks movement of the sun. But tracking the sun means the motors and actuators, at least during the day, are in constant use. Not only that, but large solar arrays can mean that the motors and actuators must move large loads and are hence subjected to large loads themselves, so it is desirable to use motors and actuators that will have a suitably long lifetime under constant heavy loads.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and system for a motor bearing support and a system using the motor bearing support are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
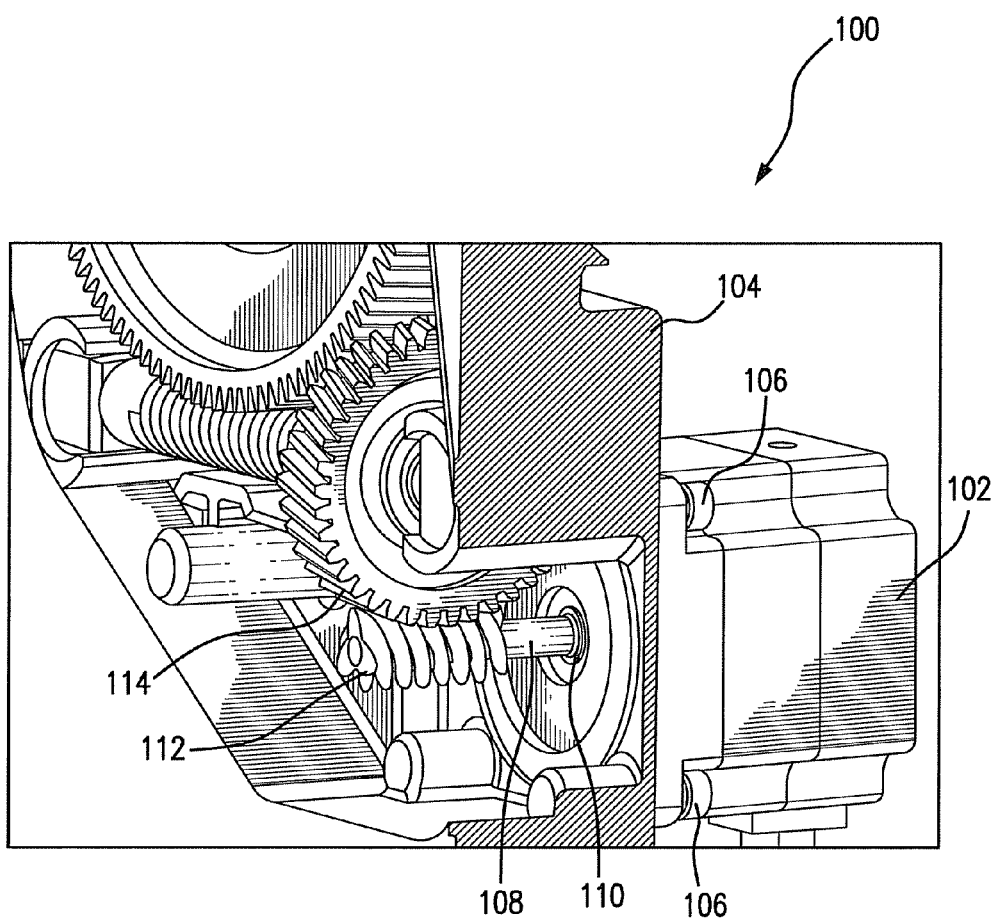
FIG. 1A is a perspective view of an embodiment of a conventional motor mounting scheme.

FIG. 1A illustrates an embodiment of a conventional motor mounting scheme 100. Motor mounting scheme 100 includes an electric motor body 102 rigidly fastened to a gearbox case 104 by motor mounting fasteners 106, which in one embodiment can be screws. Electric motor body 102 includes a motor shaft 108 that is coupled to the motor such that electric motor body 102 can rotate the motor shaft. Motor shaft 108 is mounted in electric motor body 102 using a pair of motor bearings: a front motor bearing 110 where motor shaft 108 exits electric motor body 102 and enters gearbox case 104, and a rear motor bearing 116 at or near the end of motor shaft 108 in the interior of electric motor body 102 (not shown in this figure, but see FIG. 1B). A pinion gear or driver gear 112 is mounted at or near the end of motor shaft 108, and pinion gear 112 meshes with further gears within gearbox case 104, such as driven gear 114 and further gears that mesh with driven gear 114.

Figure 1B:
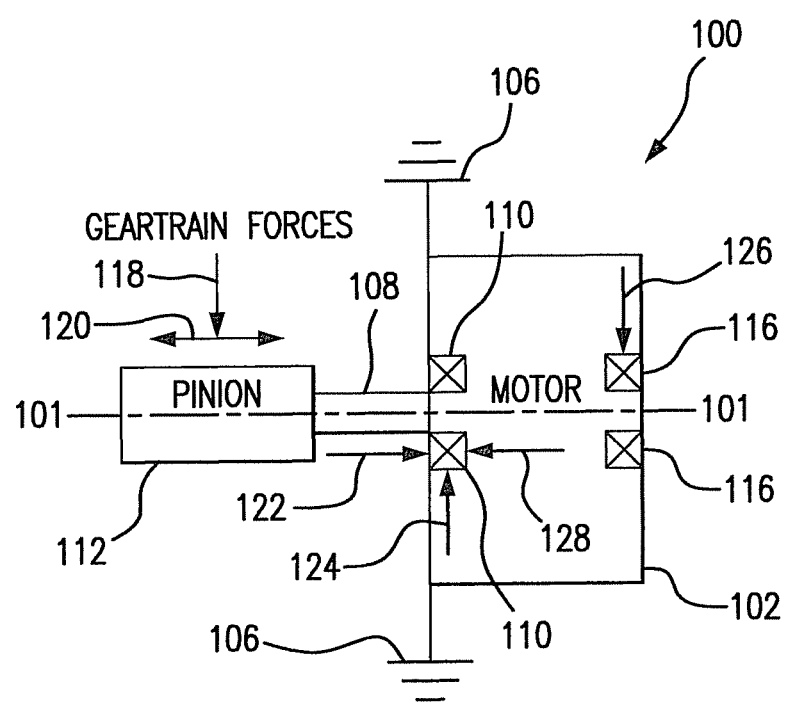
FIG. 1B is a force schematic showing the forces on the shaft and motor bearings during operation of the conventional motor mounting scheme shown in FIG. 1A.

FIG. 1B illustrates the forces on motor mounting scheme 100 during its operation. In operation, drive elements within electric motor body 102—coils and magnets an embodiment where electric motor body 102 is an electric motor—turn motor shaft 108 about a center axis (axis of rotation) 101 of the motor, shaft and pinion gear. As motor shaft 108 turns, it rotates pinion gear 112 which, because it meshes with driven gear 114, drives driven gear 114 as well as further gears with which driven gear 114 meshes.

During operation of motor mounting scheme 100, various geartrain forces are exerted on pinion 112, including a radial geartrain force 118 transverse to center axis 101, and an axial geartrain force 120 substantially parallel to center axis 101. Axial geartrain force 120 is illustrated in both directions because during operation the direction of geartrain force 120 can change depending on the direction of rotation of motor shaft 108. Radial and axial geartrain forces 118 and 120 are transmitted by motor shaft 108 to motor bearings 110 and 116 within electric motor body 102, which then exert reaction forces that counter the geartrain forces.

As a result of the way motor shaft 108 and pinion gear 112 are arranged, with the motor body 102 rigidly mounted to gearbox case 104, and as a result of the cantilevered design of the pinion at or near the end of the shaft, geartrain forces 118 and 120 are supported by front motor bearing 110 and rear motor bearing 116. In front motor bearing 110, axial geartrain forces 120 can create axial motor bearing reaction forces 122 or 128, which react to forces pulling away from or pushing toward the motor body; whether the axial motor bearing reaction force in front motor bearing 110 is force 122 or force 128—that is, the direction of the axial reaction force in the bearing—will depend on the direction of axial geartrain force 120. Radial geartrain force 118 also creates a radial motor bearing reaction force 124 in front motor bearing 110 in the opposite direction of radial geartrain force 118.

In rear motor bearing 116, radial geartrain forces 118 and axial geartrain forces 120 primarily create a radial motor bearing reaction force 126 that is substantially in the same direction as radial geartrain force 118. Together, radial motor bearing reaction forces 124 and 126 counter the bending moment created by radial geartrain force 118 being exerted at or near the end of motor shaft 108.

The axial and radial forces generated in front motor bearing 110 and rear motor bearing 116 can substantially shorten the lifetime of the bearings. In particular, the cantilevered design with the pinion mounted far from the motor bearings generates high radial loads at the motor bearings. This design is not cost effective: the high bearing loads reduce bearing life and require the use of costly oversized bearings and shafts to achieve suitable life expectancy of the motor, and the motor must be oversized relative to power output requirements to compensate for high gear loads. Because the bearings are typically internal to motor body 102, when the bearings wear out the entire motor must be replaced.

Figure 2A:
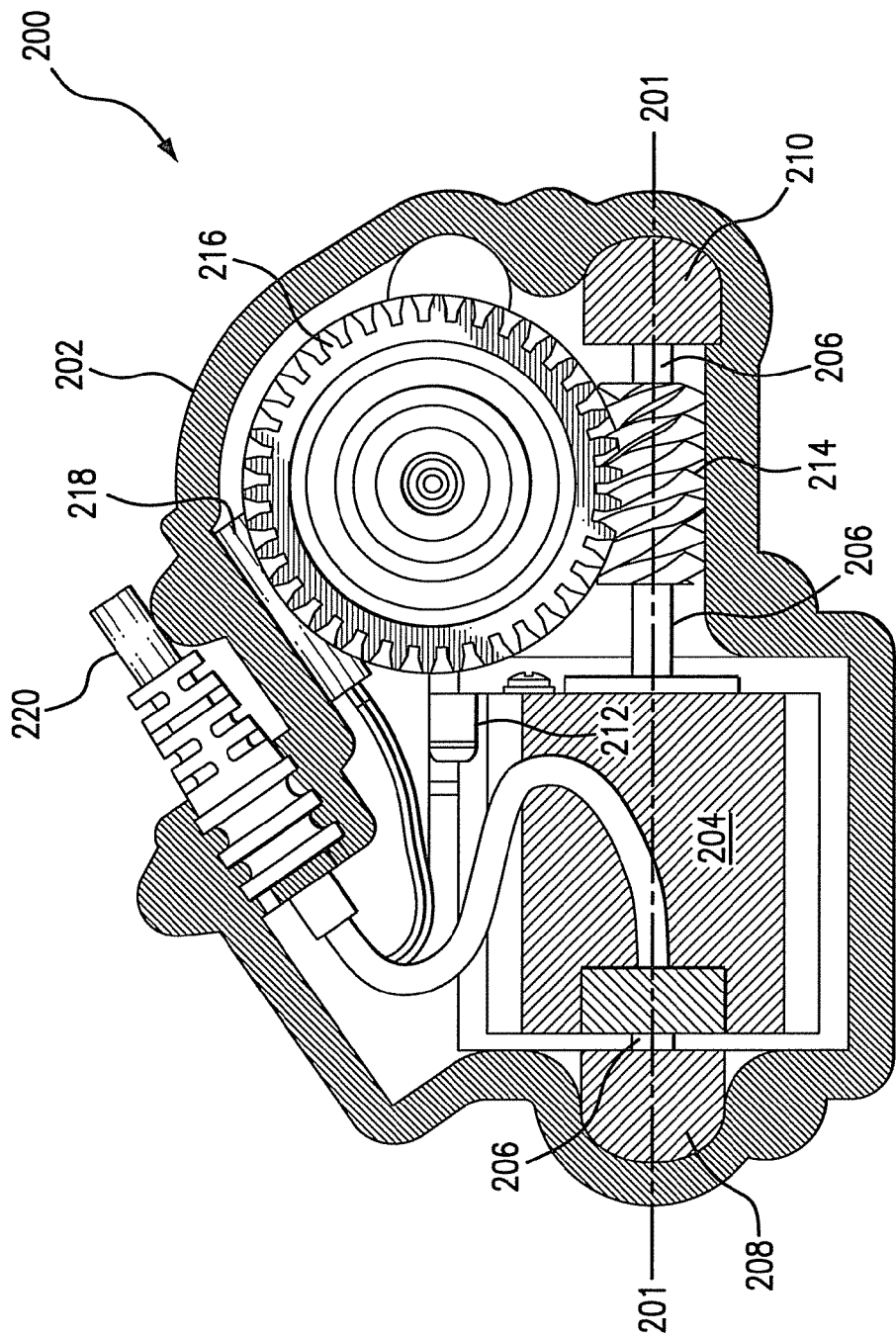
FIG. 2A is a perspective view of an embodiment of a shaft-mounted motor mounting scheme.

FIG. 2A illustrates an embodiment of a shaft-mounted motor mounting scheme 200. Shaft-mounted motor mounting scheme 200 includes a gearbox case 202 within which is positioned a motor body 204. Motor body 204 is coupled to a motor body anti-rotation bracket 212, and also includes a motor shaft 206 that extends entirely through motor body 204 from a rear shaft mount bearing 208 to a front shaft mount bearing 210. A pinion gear or drive gear 214 is mounted to motor shaft 206 between motor body 204 and front shaft mount bearing 210. Pinion gear 214 can mesh with, and drive, further gears such as driven gear 216. Driven gear 216 is supported by driven gear bearing 218 and can also be coupled to additional elements such as drive shaft 217.

Motor body 204 includes a motor housing that has therein internal drive elements, such as magnets and wire coils in an embodiment where motor body 204 is an electric motor, that are coupled to motor shaft 206 so that motor body 204 can rotate motor shaft 206 about center axis (axis of rotation) 201 of the motor, shaft and pinion gear. In one embodiment, motor body 204 can be reversible, meaning that it can rotate motor shaft 206 in both directions about center axis 201. Motor body 204 is further coupled to a motor body anti-rotation bracket 212 that engages gearbox case 202, such as by contact, to rotationally constrain motor body 204 when it is activated; in other words, to ensure that motor body 204 remains stationary while motor shaft 206 rotates, rather than vice versa. In an embodiment where motor body 204 is electrical, power can be supplied to motor body 204 through electrical harness 220.

Motor shaft 206 is coupled to rear shaft mount bearing 208 and extends completely through motor body 204 to front shaft mount bearing 210; motor body 204 is thus supported in gearbox case 202 by constraining both ends of motor shaft 206 using the shaft mount bearings. In the illustrated embodiment, both shaft mount bearings 208 and 210 are removably constrained by crevices within gearbox case 202 such that bearings 208 and 210, and/or the entire group of elements including motor body 204, motor shaft 206, shaft mount bearings 208 and 210 and motor body anti-rotation bracket 212, can be easily removed and replaced when necessary simply by taking them out of gearbox case 202 and slipping new ones in. In other embodiments, however, rear shaft mount bearing 208 and front shaft mount bearing 210 can be more permanently affixed to gearbox case 202.

In the illustrated embodiment, both shaft mount bearing 208 and shaft mount bearing 210 are integrated radial and one-sided thrust bearings, meaning that the shaft mount bearings are single units that can take up both radial and axial loads. In other embodiments, rear shaft mount bearing 208 and front shaft mount bearing 210 need not be integrated—that is, in other embodiments shaft mount bearings 208 and 210 can be combinations that include separate radial bearings and thrust bearings. In still other embodiments, rear shaft mount bearing 208 and front shaft mount bearing 210 need not be the same type of bearing or the same combination of bearings, so long as the shaft mount bearings used can take up both radial and axial loads.

Pinion gear 214 is coupled to motor shaft 206 at a position on the shaft between shaft mount bearing 210 and motor body 204. Pinion gear 214 further meshes with driven gear 216, and driven gear 216 can be further coupled to other gears or devices in which motion is desired, for example via drive shaft 217.

Figure 2B:
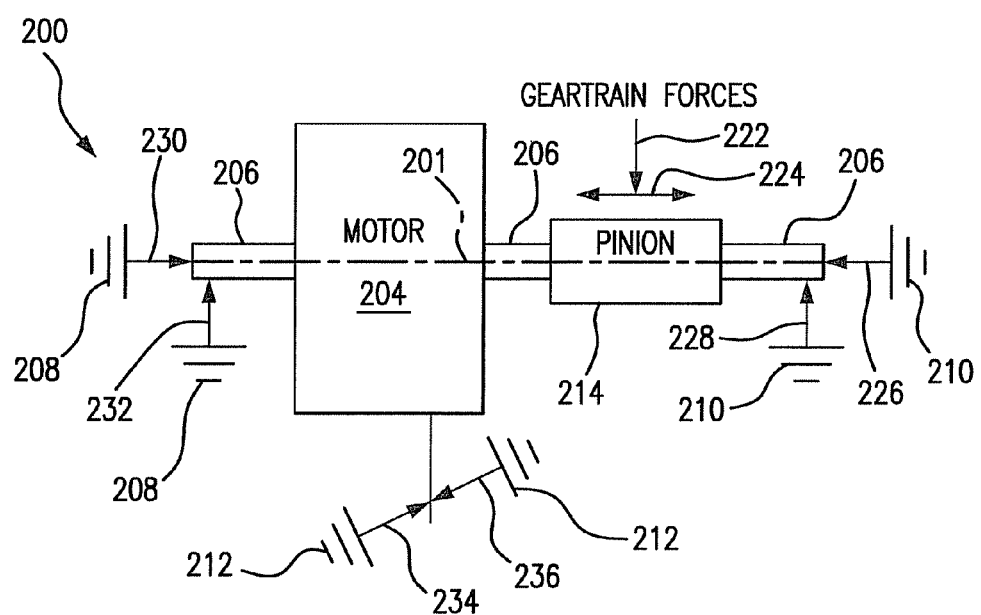
FIG. 2B is a force schematic showing the forces on the shaft and motor bearings during operation of the shaft-mounted motor mounting scheme shown in FIG. 2A.

FIG. 2B illustrates the forces that occur during operation of assembly 200. In operation, drive elements within motor body 204—coils and magnets in an embodiment where motor body 204 is an electric motor—turn motor shaft 206 about center axis 201 of the motor, shaft and pinion gear. As motor shaft 206 turns, it rotates pinion gear 214 which meshes with, and turns, driven gear 216. Driven gear 216 then turns drive shaft 217.

During operation of motor and gear assembly 200, rotation of motor body 204 is constrained by forces applied to the motor housing by motor body anti-rotation bracket 212, which engages with gearbox case 202 and applies an anti-rotation reaction force 234 from the gearbox case to the motor body ($+\omega$ in one rotational direction) or an anti-rotation reaction force 236 from the gearbox case to the motor body ($-\omega$ in an opposite rotational direction), depending on the motor's direction of rotation. Operation also exerts various geartrain forces on pinion 214, including a radial geartrain force 222 transverse to center axis 201, and an axial geartrain force 224 substantially parallel to center axis 201. Axial geartrain force 224 is illustrated in both directions because during operation the direction of axial geartrain force 224 can change depending on the direction of rotation of motor shaft 206. Radial and axial geartrain forces 222 and 224 are transmitted by motor shaft 206 to shaft mount bearings 208 and 210, which exert reaction forces that counter the geartrain forces.

As a result of the way motor shaft 206, pinion gear 214 and shaft mount bearings 208 and 210 are arranged, radial geartrain forces 222 and axial geartrain forces 224 are supported almost exclusively by shaft mount bearings 208 and 210. In rear shaft mount bearing 208, axial geartrain forces 224 are opposed by an axial rear mount bearing reaction force 230, while the radial geartrain forces 222 are opposed by radial rear mount bearing reaction force 232. Similarly, in front shaft mount bearing 210 axial geartrain forces 224 are opposed by axial front mount bearing reaction force 226, while radial geartrain forces 222 are opposed by radial front mount bearing reaction force 228. By carrying both the axial geartrain forces 224 and radial geartrain forces 222, shaft mount bearings 208 and 210 reduce or eliminate loads in bearings within motor body 204, extending the life of bearings within the motor body 204 and the life of motor body 204 itself. This arrangement has several advantages. It isolates the motor bearings from the geartrain forces and allows the use of smaller, lower cost motors and bearings and results in increased motor bearing life due to lower loading. All geartrain reaction forces can be supported by optimized bearings designed for loads, life and cost and the motor body anti-rotation bracket constrains motor body 204 so the electromechanical force generated by the motor results in rotational motion of motor shaft 206, which turns the pinion and geartrain. Finally, in one embodiment mounting requires no fastening hardware; the elements including motor body 204, motor shaft 206, shaft mount bearings 208 and 210 and motor body anti-rotation bracket 212 simply drop into place and are constrained by gearbox case 202.

Figure 3:
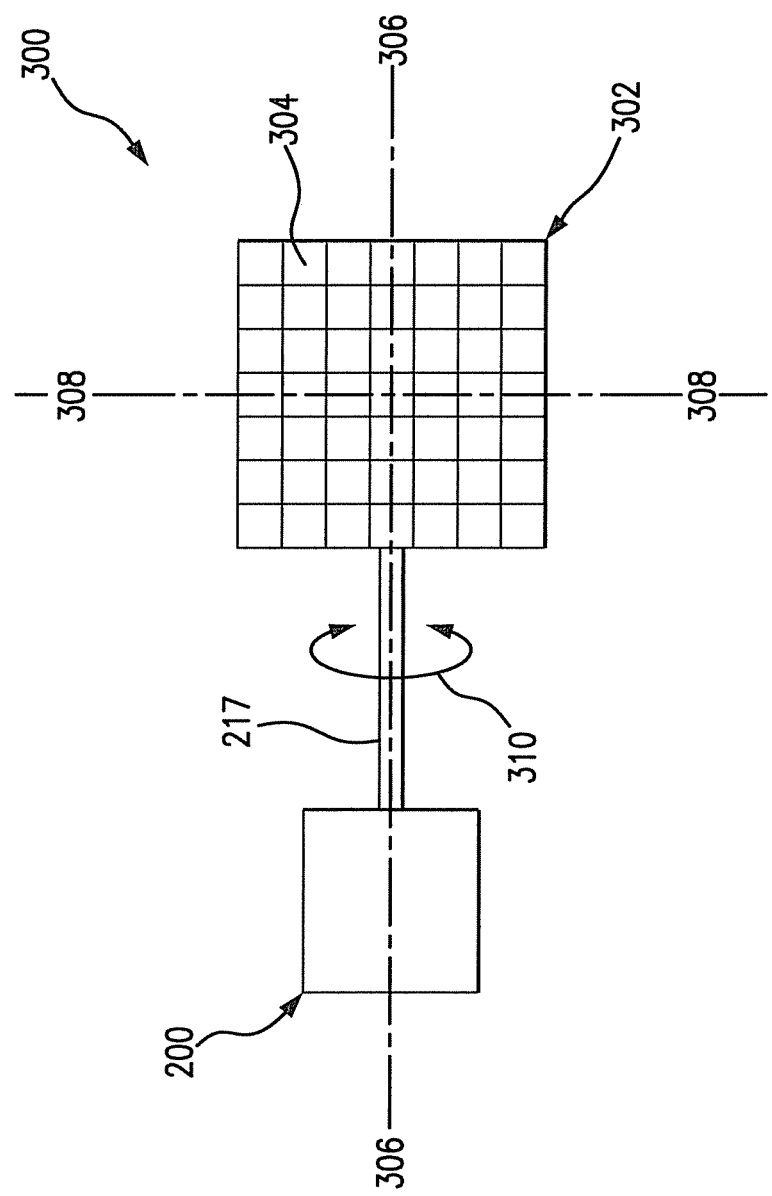
FIG. 3 is a drawing of an embodiment of a tracking system for a concentrator photovoltaic array that can use an embodiment of a motor and gear system such as the one illustrated in FIGS. 2A-2B.

FIG. 3 illustrates an embodiment of a solar tracking system 300 for a concentrator photovoltaic (CPV) array. Tracking system 300 includes a CPV array 302 that includes a plurality of individual CPV cells 304. A drive shaft 217 is coupled to shaft-mounted motor 200 and can rotate in both directions, as illustrated by arrows 310. Drive shaft 217 is also coupled to CPV array 302 via a tilt mechanism that allows drive shaft 217 to tilt CPV array 302 at least about axis 306. Depending on the nature of the tilt mechanism coupled to drive shaft 217 and CPV array 302, drive shaft 217 can tilt CPV array 302 about multiple axes, such as about both axes 306 and 308. In other embodiments, however, a separate shaft-mounted motor schemes 200 can be used to drive the tilt about each axis about which tilt is desired.

The above description of illustrated embodiments of the invention, including what is described in the abstract, is not intended to be exhaustive or to limit the invention to the precise forms described. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A concentrator photovoltaic (CPV) array drive system comprising:
   one or more concentrator photovoltaic (CPV) arrays, wherein each CPV array of the one or more CPV arrays is configured to be tilted about at least one axis of rotation;
   a tilt mechanism coupled to the one or more CPV arrays, wherein the tilt mechanism is configured to tilt each CPV array of the one or more CPV arrays about the at least one axis of rotation; and
   a drive coupled to the tilt mechanism, the drive comprising:
      a gearbox case;
      a motor body housed within the gearbox case;
      a motor shaft coupled to and extending through a motor bearing of the motor body and having an axis of rotation;
      a front shaft mount bearing coupled to one distal end of the motor shaft and a rear shaft mount bearing coupled to the other distal end of the motor shaft, wherein the front and rear shaft mount bearings are constrained by the gearbox case;
      a driver gear coupled to the motor shaft; and
      a driven gear coupled to the driver gear and to a drive shaft, the drive shaft being coupled to the tilt mechanism to tilt of the one or more CPV arrays;
   wherein the front and rear shaft mount bearings transfer loads from the motor bearing to the gearbox case to reduce stress on the motor bearing caused by the loads.

2. The system of claim 1, further comprising a motor body anti-rotation bracket coupled to the motor body.

3. The system of claim 2, wherein the motor body anti-rotation bracket engages the gearbox case.

4. The system of claim 1, wherein the front and rear shaft mount bearings are removably constrained in the gearbox case.

5. The system of claim 1, wherein the front and rear shaft mount bearings are integrated radial and one-sided thrust bearings.

6. The system of claim 1, wherein the driver gear coupled to the motor shaft is a pinion gear.

7. The system of claim 1, wherein the motor body is an electric motor.

8. The system of claim 1, wherein the motor body is reversible such that the motor shaft can rotate in both directions about the axis of rotation of the motor shaft.

9. A concentrator photovoltaic (CPV) array drive for use in tilting one or more CPV arrays comprising:
   a gearbox case;
   a motor body housed within the gearbox case;
   a motor shaft coupled to and extending through the motor body from a front end to a rear end along an axis of rotation;
   a front shaft mount bearing rotatably coupled to the motor shaft proximate the front end and a rear shaft mount bearing rotatably coupled to the motor shaft proximate the rear end, wherein the front and rear shaft mount bearings are configured to allow the motor shaft to rotate about the axis of rotation and to transfer a radial geartrain force that is transverse to the axis of rotation from the motor shaft to the gearbox case to reduce stress on motor bearings within the motor body.

10. The system of claim 9, wherein the front shaft mount bearing is rotatably coupled to the front end of the motor shaft and the rear shaft mount bearing is rotatably coupled to the rear end of the motor shaft.

11. The system of claim 9, wherein the radial geartrain force is supported almost exclusively by the front and rear shaft mount bearings.

12. The system of claim 9, further comprising a tilt mechanism coupled to the one or more CPV arrays and to the drive, wherein the tilt mechanism is configured to tilt the one or more CPV arrays using the drive, wherein the tilt mechanism is configured to tilt each CPV array of the one or more CPV arrays about at least one system axis of rotation.

13. The system of claim 9, wherein the drive further comprises:
   a driver gear coupled to the motor shaft between the motor body and the front shaft mount bearing;
   a driven gear meshed with and driven by the driver gear; and
   a drive shaft coupled to the driven gear for use in tilting the one or more CPV arrays.

14. The system of claim 9, wherein each of the front and rear ends of the motor shaft are located outside of the motor body.

15. The system of claim 9, wherein each of the front and rear shaft mount bearings are constrained by the gearbox case.

16. The system of claim 9, wherein each of the front and rear shaft mount bearings are affixed to the gearbox case.

17. The system of claim 9, wherein the motor body is positioned between the front shaft mount bearing and the rear shaft mount bearing.

18. The system of claim 9, wherein the drive further comprises an anti-rotation bracket coupled to the motor body, wherein the anti-rotation bracket engages the gearbox case to apply a reaction force to restrict the motor body from rotating about the axis of rotation.

19. A concentrator photovoltaic (CPV) array drive for use in driving one or more CPV arrays comprising:
   a gearbox case;

a motor body housed within the gearbox case, wherein the motor body extends from a first side to a second side along an axis of rotation;

a motor shaft coupled to and extending through the motor body along the axis of rotation;

a front shaft mount bearing rotatably coupled to the motor shaft on the first side of the motor body and a rear shaft mount bearing rotatably coupled to the motor shaft proximate the second side of the motor body, wherein the front and rear shaft mount bearings are configured to allow the motor shaft to rotate about the axis of rotation and to transfer a radial geartrain force that is transverse to the axis of rotation from the motor shaft to the gearbox case to reduce stress on motor bearings within the motor body, wherein the front shaft mount bearing is rotatably coupled to the motor shaft such that the radial geartrain force is between the front shaft mount bearing and the motor body.

\* \* \* \* \*